United States Patent
Bachl et al.

(10) Patent No.: US 8,335,541 B2
(45) Date of Patent: Dec. 18, 2012

(54) METHOD OF GROUPING USERS FOR OPPORTUNISTIC DOWNLINK IN MULTIUSER, MULTIPLE-INPUT-MULTIPLE-OUTPUT WIRELESS COMMUNICATION

(75) Inventors: Rainer Bachl, Nuremberg (DE); Angel Lozano, Hoboken, NJ (US)

(73) Assignee: Alcatel-Lucent Technologies US, Inc., Nurray Hill, NJ (US)

( * ) Notice: Subject to any disclaimer, the term of this patent is extended or adjusted under 35 U.S.C. 154(b) by 1054 days.

(21) Appl. No.: 11/742,861

(22) Filed: May 1, 2007

(65) Prior Publication Data
US 2008/0274771 A1 Nov. 6, 2008

(51) Int. Cl.
*H04M 1/00* (2006.01)
(52) U.S. Cl. ............... 455/562.1; 455/575.5; 455/575.6; 455/575.7; 455/63.4; 370/338; 370/310
(58) Field of Classification Search ............ 455/561, 455/562.1, 464, 509, 63.4, 82–84, 575.5–575.7, 455/121, 129, 193.1; 370/329, 341–342, 370/310, 338
See application file for complete search history.

(56) References Cited

U.S. PATENT DOCUMENTS

| | | | |
|---|---|---|---|
| 7,313,114 B2* | 12/2007 | Karjalainen | 370/335 |
| 2007/0183380 A1* | 8/2007 | Rensburg et al. | 370/338 |
| 2008/0095259 A1* | 4/2008 | Dyer et al. | 375/265 |

* cited by examiner

*Primary Examiner* — Wayne Cai
(74) *Attorney, Agent, or Firm* — Williams, Morgan & Amerson

(57) ABSTRACT

The present invention provides a method implemented in a base station having a plurality of antennas. The method includes associating a plurality of users with a plurality of first pre-coding matrices based on information provided by the plurality of users. The method also includes determining whether at least one of the plurality of first pre-coding matrices is incomplete and associating users with at least one second pre-coding matrix when at least one first pre-coding matrix is incomplete. The users are associated with the incomplete first pre-coding matrix and the second pre-coding matrix is formed based on the incomplete first pre-coding matrix.

16 Claims, 3 Drawing Sheets

METHOD OF GROUPING USERS FOR OPPORTUNISTIC DOWNLINK IN MULTIUSER, MULTIPLE-INPUT-MULTIPLE-OUTPUT WIRELESS COMMUNICATION

BACKGROUND OF THE INVENTION

1. Field of the Invention

This invention relates generally to communication systems, and, more particularly, to wireless communication systems.

2. Description of the Related Art

Base stations in wireless communication systems provide wireless connectivity to users within the geographic area, or cell, associated with the base station. The wireless communication links between the base station and each of the users typically includes one or more downlink (or forward) channels for transmitting information from the base station to the mobile unit and one or more uplink (or reverse) channels for transmitting information from the mobile unit to the base station. Multiple-input-multiple-output (MIMO) techniques may be employed when the base station and, optionally, the user terminals include multiple antennas. For example, a base station that includes multiple antennas can transmit multiple independent and distinct signals to multiple users concurrently and on the same frequency band. MIMO techniques are capable of increasing the spectral efficiency of the wireless communication system roughly in proportion to the number of antennas available at the base station. However, the base station also requires information about the state of the downlink channel(s) to each of the users to select users that have approximately orthogonal downlink channels for concurrent transmission. The channel feedback may be provided by the users on the reverse link, but this increases overhead associated with the MIMO transmissions, which reduces the spectral efficiency of the wireless communication system.

Random fluctuations in the channel states can create sets of downlink channels that are approximately orthogonal. Thus, if the number of users associated with a base station is large, these random fluctuations naturally tend to create groups of users that have approximately orthogonal downlink channels. Opportunistic MIMO schemes identify these groups of users so that the interference between the concurrent transmissions from the base station to the users in the selected group is within an acceptable tolerance level. For example, let $n_T$ denote the number of transmit antennas at the base station and let K indicate the number of users connected to the base station. Each user is equipped with $n_R$ receive antennas. The channel coefficients between each transmit antenna and each receive antenna at user k can be assembled into an $n_R \times n_T$ matrix $H_k$, k=1, ..., K.

In a multi-user MIMO system that employs linear unitary pre-coding matrices, the base station can transmit concurrently to as many as $n_T$ users, which can be chosen from the population of K users. The relationship between transmit and receive signals can be represented as:

$$y = HUs + n \quad (1)$$

where s is an $n_T$-dimensional vector containing the transmit signals, y is the $n_R$-dimensional vector of received signals, n is an $n_R$-dimensional noise vector, and U is an $n_T \times n_T$ unitary pre-coding matrix, i.e., a matrix satisfying $UU^H = I$. Note that some of the entries of s may be zero if the base station chooses to transmit to less than $n_T$ users (this is sometimes termed "rank adaptation"). Each base station typically stores a codebook consisting of L pre-coding matrices, $U_i$, i=1, ..., L. Altogether, the L pre-coding matrices amount to $n_T \cdot L$ column vectors, where each column vector has $n_T$ entries.

The pre-coding matrices map the signals onto the available channels. The base station can vary this mapping to adapt to the channel conditions by selecting different pre-coding matrices based on the base station's knowledge of the matrices $H_k$, k=1, ..., K. Information about the matrix $H_k$ can be reported to the base station using feedback from the mobile unit. For example, when the base station implements an opportunistic scheme, each user periodically reports a preferred subset of the column vectors in the codebook via the reverse link to the base station. The users also report a quality indicator corresponding to a hypothetical transmission associated with each preferred column. The size of the subset of columns that can be selected and reported by each user is a parameter that can be anywhere between 1 and $n_T \cdot L$. For each pre-coding matrix $U_i$ in the codebook, the base station identifies those users that have expressed preference for a column vector from that matrix $U_i$ and associates those users with that matrix $U_i$. Only one user can be associated with each column, so if several users have expressed preference for the same column vector of that matrix $U_i$, only one of those users is retained in the association (this can be done randomly or based on priorities). Thus, there are at most $n_T$ users associated with each matrix $U_i$. Note that each user could be associated with multiple pre-coding matrices $U_i$.

The base station selects one of the pre-coding matrices, e.g. on the basis of priorities of the users associated with the matrices $U_i$. The priorities can be determined by a scheduler in the base station. Once the matrix and associated users have been identified, the base station can begin concurrent transmission to the selected users using the corresponding pre-coding matrix $U_i$. Although the performance could be expected to improve with growing L and the corresponding increase in the granularity of the pre-coding, the contrary has been shown to be the case, i.e., the performance of the system degrades with growing L. As L grows while the total number of users K remains constant, the probability that several users will select a column in the same pre-coding matrix diminishes and vanishes for L→∞. Thus, when L is very large the base station ends up transmitting mostly to one user at a time, thereby forfeiting the multiuser MIMO advantage.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided that is implemented in a base station having a plurality of antennas. The method associating a plurality of users with a plurality of first pre-coding matrices based on information provided by the plurality of users. The method also includes determining whether at least one of the plurality of first pre-coding matrices is incomplete and associating users with at least one second pre-coding matrix when at least one first pre-coding matrix is incomplete. The users are associated with the incomplete first pre-coding matrix and the second pre-coding matrix is formed based on the incomplete first pre-coding matrix.

In another embodiment of the present invention, a method is provided that is implemented in a mobile unit configured to communicate with a base station having a plurality of antennas. The method includes providing, to the base station, information that the base station is configured to use to associate the mobile unit with at least one of a plurality of first pre-coding matrices. The base station is also configured to determine whether at least one of the plurality of first pre-coding matrices is incomplete and associate user terminals with at least one second pre-coding matrix when at least one first pre-coding matrix is incomplete. The user terminals are associated with the incomplete first pre-coding matrix and the second pre-coding matrix is formed based on the incomplete first pre-coding matrix.

BRIEF DESCRIPTION OF THE DRAWINGS

The invention may be understood by reference to the following description taken in conjunction with the accompanying drawings, in which like reference numerals identify like elements, and in which.

Figure 1:
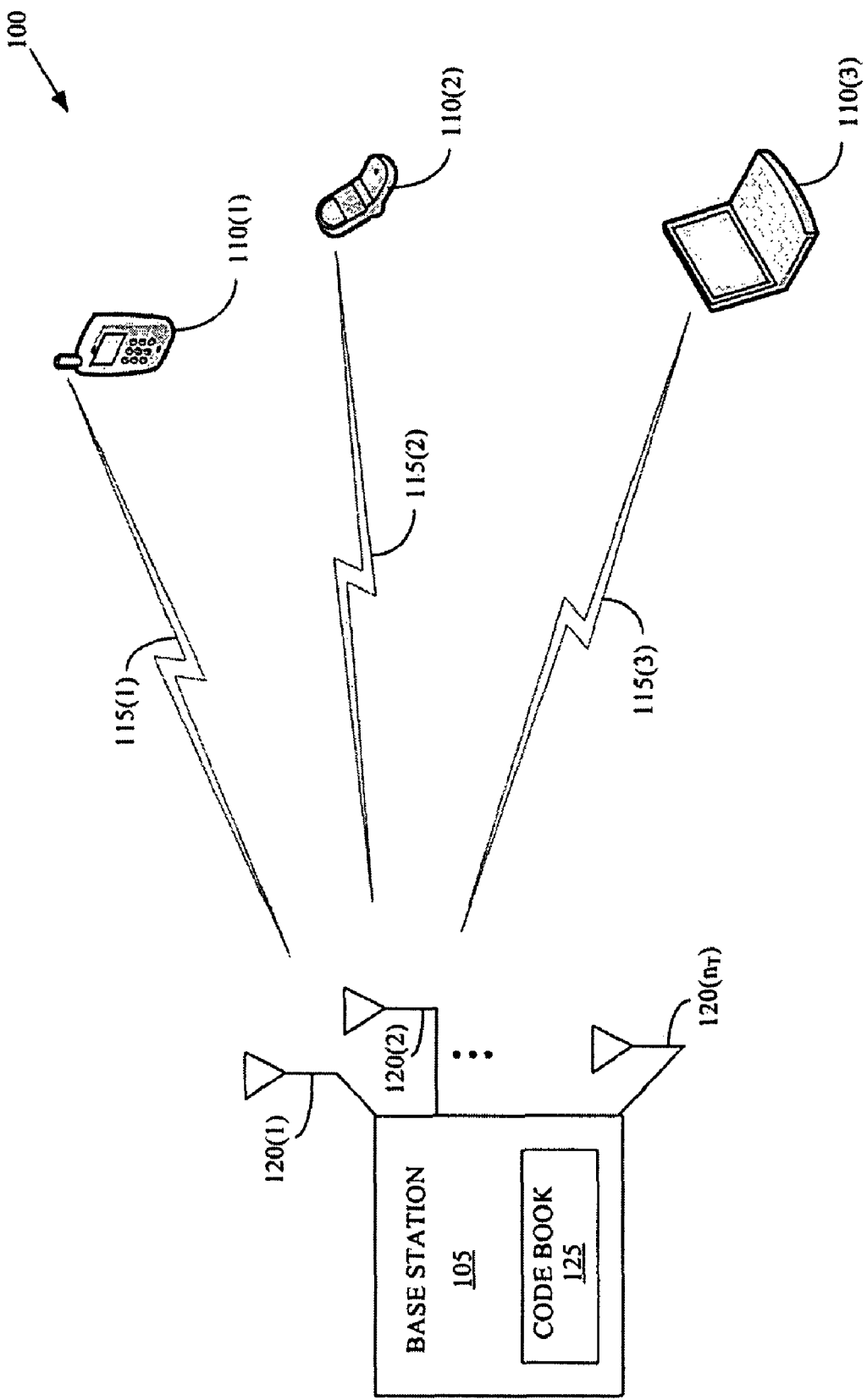
FIG. 1 conceptually illustrates one exemplary embodiment of a wireless communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a wireless communication system 100. In the illustrated embodiment, the wireless communication system 100 includes a base station 105 that provide wireless connectivity to users 110 over corresponding air interfaces 115. However, persons of ordinary skill in the art having benefit of the present disclosure should appreciate that the present invention is not limited to wireless communication systems 100 that use base stations 105 to provide wireless connectivity. In alternative embodiments, the wireless communication system 100 may use other devices to provide wireless connectivity, such as base transceiver stations, base station routers, WiMAX or WiFi access points, access networks, and the like. Techniques for establishing, maintaining, and operating air interfaces 115 to provide wireless communication links between the base station 105 and the users 110 are known in the art and in the interest of clarity only those aspects of establishing, maintaining, and operating the air interfaces 115 that are relevant to the present invention will be discussed herein.

The base station 105 includes multiple antennas 120 for transmitting and/or receiving information over the air interface is 115. Although three antennas 120 are depicted in FIG. 1, persons of ordinary skill in the art having benefit of the present disclosure should appreciate that the base station 105 is not limited to any particular number of antennas 120. Moreover, persons of ordinary skill in the art having benefit of the present disclosure should appreciate that, in some embodiments, the users 110 may also include multiple antennas. The base station 105 may employ multiple-input-multiple-output (MIMO) techniques may so that the multiple antennas 120 can transmit multiple independent and distinct signals to the users 110 concurrently and on the same frequency band. The base station 105 may therefore store a code book 125 of pre-coding matrices, $U_i$. In one embodiment that includes a base station 105 having $n_T$ antennas 120, the pre-coding matrices, $U_i$ are $n_T \times n_T$ unitary pre-coding matrices, i.e. satisfying $UU^H=I$. Note that some of the entries of s may be zero if the base station 105 chooses to transmit to less than $n_T$ users (this is sometimes termed "rank adaptation").

The pre-coding matrices stored in the codebook 125 are organized into multiple levels such that each of the pre-coding matrices in a relatively lower level are associated with one of the pre-coding matrices in the next higher level. The pre-coding matrices in a higher-level are each associated with more than one of the pre-coding matrices in the next lower level. For example, as will be discussed in more detail below, the pre-coding matrices may be organized in a tree structure such that higher-level pre-coding matrices are associated with multiple branches that indicate lower level pre-coding matrices. In one embodiment, the higher level pre-coding matrices are associated with lower level pre-coding matrices using a distance metric that indicates a distance between the higher and lower level pre-coding matrices, as will be discussed in detail below.

The base station 105 is configured to associate the users 110 with columns in the pre-coding matrices stored in the codebook 125 using feedback provided by the users 110. In one embodiment, the feedback includes information indicating one or more preferred columns in the pre-coding matrices. The feedback may also include channel condition information indicating the current state or condition of one or more channels of the air interface is 115. Initially, the base station 105 attempts to associate the users 110 with columns in the lowest level pre-coding matrices. For example, for each pre-coding matrix in the codebook lowest level, the base station 105 identifies the users 110 that have expressed a preference for a column vector of that pre-coding matrix and associates those users 110 with that pre-coding matrix. If more than one mobile unit 110 has expressed preference for the same column vector of a pre-coding matrix, only one of those users 110 is associated with pre-coding matrix. In various alternative embodiments, the base station 105 may use a priority scheme or another allocation scheme to resolve conflicts between users 110 that have selected the same column vector of a pre-coding matrix.

The base station 105 may then determine whether or not the lowest level pre-coding matrices are complete. As used herein, the term "complete" will be understood to indicate that a selected number or percentage of the columns in the pre-coding matrices have been associated with the mobile unit 110. For example, when $n_T$ users 110 are associated with a pre-coding matrix, i.e., all of the columns in the pre-coding matrix have been associated with a user 110, the pre-coding matrix can be deemed complete. However, persons of ordinary skill in the art having benefit of the present disclosure should appreciate that a pre-coding matrix may be deemed complete even though some of its columns have not been associated with a mobile unit 110.

If any of the lowest level pre-coding matrices is incomplete, then the base station 105 selects one or more higher-level pre-coding matrices based on the incomplete lower-order pre-coding matrices. For example, the base station 105 may select a higher-level pre-coding matrix that is relatively close to a plurality of incomplete low order pre-coding matrices, e.g., based upon a distance metric. In one embodiment, the base station 105 may form a higher level pre-coding matrix based on the lower level pre-coding matrices. Alternatively, the base station 105 may use a predetermined higher-level pre-coding matrix. The base station may then attempt to associate the users 110 that expressed a preference for the incomplete lower-level pre-coding matrices with the higher-level pre-coding matrices. In one embodiment, the base station 105 associates the users 110 with columns in the higher-level pre-coding matrices based upon preferences indicated by the users 110. If more than one mobile unit 110 has expressed preference for the same column vector, one of the users 110 is associated with each column, e.g., based upon priorities or another allocation algorithm. At the end of this second stage, higher-level pre-coding matrices having the selected number or percentage of columns associated with users are deemed complete. The above process continues for a (possibly pre-determined) number of stages or until all the pre-coding matrices are complete, whichever happens first. This approach is scalable with the amount of feedback from the users 110, and therefore may overcome some of the problems that exist in currently proposed opportunistic techniques.

Figure 2:
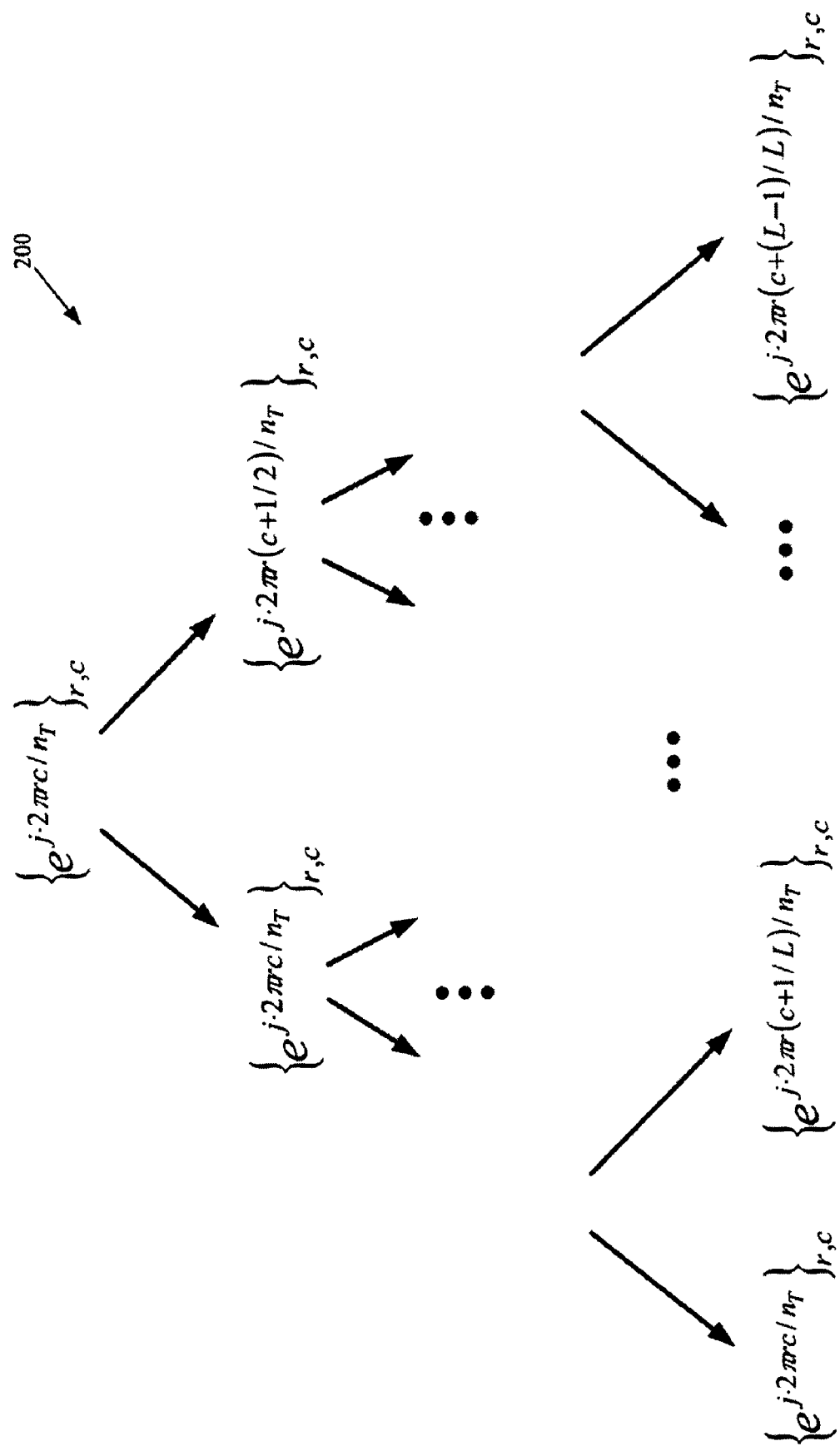
FIG. 2 conceptually illustrates one exemplary embodiment of a codebook of pre-coding matrices, in accordance with the present invention.

FIG. 2 conceptually illustrates one exemplary embodiment of a codebook 200 of pre-coding matrices. In the illustrated embodiment of the codebook 200, pre-coding matrices are Fourier matrices and the (r,c)-th entry of the i-th matrix is given by:

$$\{U_i\}_{r,c} = \exp\{-j2\pi r(c+i/L)/n_T\} \quad (2)$$

for $i=0, \ldots, L-1$ and $r,c=0, \ldots, n_T-1$. It may be noted that these matrices are unitary by construction. The Fourier matrices at lower levels have a finer angular resolution compared to the Fourier matrices at higher levels. In the illustrated embodiment, the L Fourier matrices are arranged in such a way that each terminates the branch of a tree having L levels. Branches are connected to the higher level, respectively, for those matrices that minimize selected distance metric with the matrix at the higher level. The distance metric between pre-coding matrices is selected to identify how the matrices are associated between different levels. For example, the distance metric can be used to identify pre-coding matrices that are close according to the metric chosen and therefore these matrices could be combined when constructing a higher level pre-coding matrix. The distance metrics may also quantify the "closeness" of pre-coding matrices among different levels. The closeness may be used as an indicator of the performance losses that may result from not using the pre-coding vector that has been chosen by a user.

For Fourier pre-coding matrices, one choice for the distance metric is the angle difference between the main lobe directions of the antenna patterns corresponding to each Fourier pre-coding matrix. However, persons of ordinary skill in the art having benefit of the present disclosure should appreciate that this distance metric is illustrative and is not meant to limit the present invention. In alternative embodiments, which may implement different pre-coding matrices, other distance metrics may be used, particularly for pre-coding matrices that are not amenable to the simple geometric interpretation used for Fourier pre-coding matrices. For example, the inner product may be used as a distance metric. In general, pre-coding matrices are close when the inner product for the corresponding pre-coding vectors is large, and when the inner product for the non-corresponding pre-coding vectors is small. Hence, the closeness C of two unitary pre-coding matrices $U_m$ and $U_n$ can be expressed by a numerical value as:

$$C = 2 \cdot tr\{U_m^H U_n\} - n_T \quad (3)$$

where tr{.} is the trace of a matrix. Since the constant $n_T$ and the factor 2 in Eq. (3) are not relevant for expressing the relative distance or closeness of pre-coding matrices, the closeness can be simply defined as $$C_{unitary} = tr\{U_m^H U_n\} \quad (5)$$

Referring back to FIG. 1, the base station 105 may use modified pre-coding matrices that are formed based upon the pre-coding matrices stored in the codebook 125. At each level starting with the lowest one, two or more pre-coding matrices that are close according to the desired distance metric are combined into a new pre-coding matrix at the immediately superior level. In one embodiment, the pre-coding matrices at tree levels above the lowest one can be pre-computed and stored, rather than computed every time they are needed. The combination of the matrices to form those at the superior level can be made using a constrained least-squares criterion, which leads to $$U_{(m,n)} = \underset{X}{\operatorname{argmin}}\left\{\left\|\begin{bmatrix} U_m^H \\ U_n^H \end{bmatrix} X - \begin{bmatrix} U_m^H U_m \\ U_n^H U_n \end{bmatrix}\right\|_F^2\right\} \quad (4)$$

This optimization corresponds to the Procrustes problem with a known and straightforward solution. The formulation can be easily extended to more than two matrices in the constrained least-squares combining operation.

Figure 3:
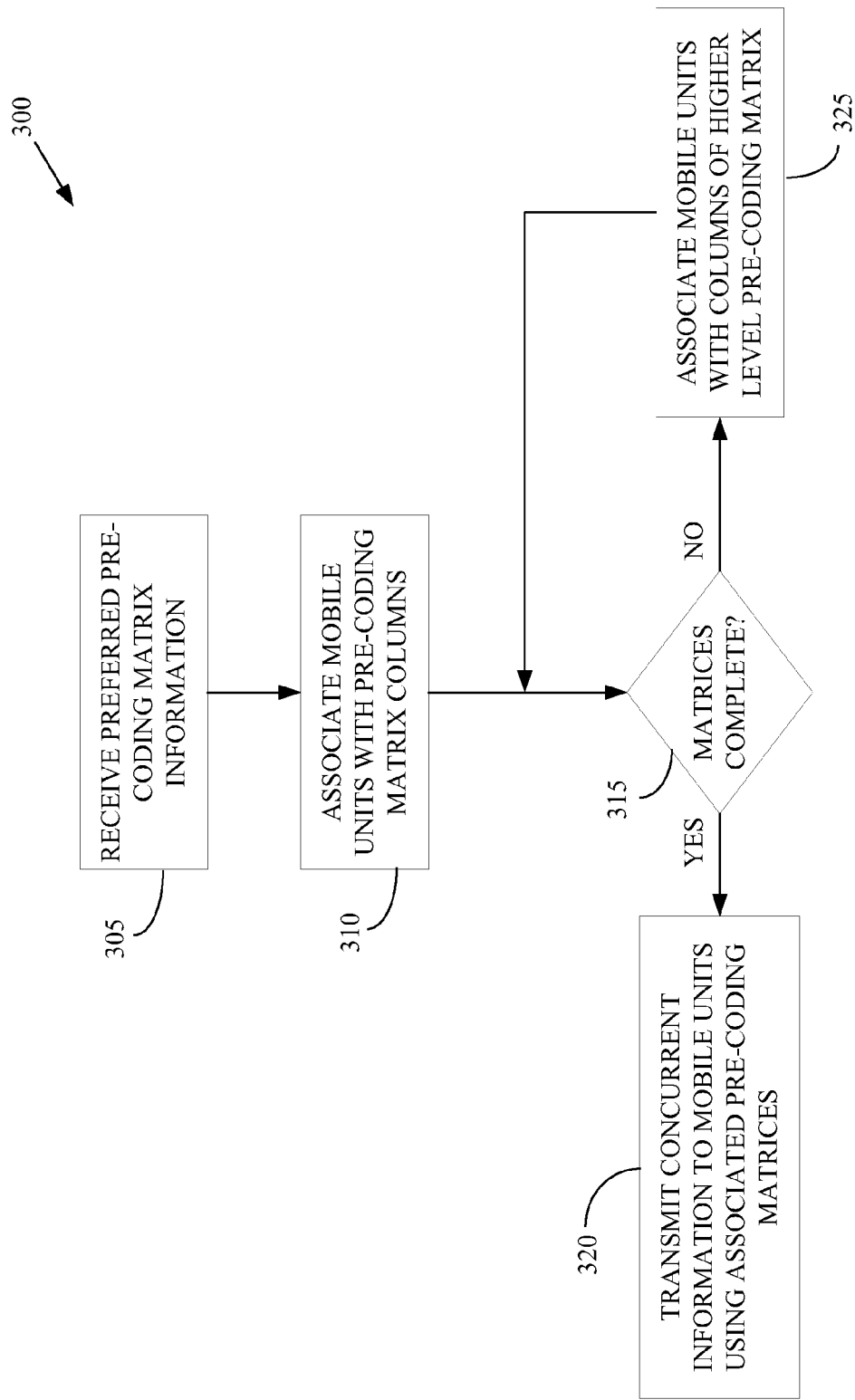
FIG. 3 conceptually illustrates one exemplary embodiment of a method of grouping users for opportunistic downlink transmissions in multiuser multiple-input-multiple-output communications, in accordance with the present invention.

FIG. 3 conceptually illustrates one exemplary embodiment of a method 300 of grouping users for opportunistic downlink transmissions in multi-user multiple-input-multiple-output communications. In the illustrated embodiment, a base station receives (at 305) information transmitted by one or more users indicating preferred columns of one or more pre-coding matrices. The base station may then associate (at 310) users with columns of the lowest-level pre-coding matrices using the information provided by the users. If the base station is able to associate (at 310) the users with the lowest-level pre-coding matrices such that the matrices are determined (at 315) to be complete, then the base station may transmit (at 320) concurrent information to the users using the associated lowest-level pre-coding matrices.

If the base station that determines (at 315) that some of the lowest-level pre-coding matrices are not complete, then the base station associates (at 325) the users with higher-level pre-coding matrices that are associated with the incomplete lower-level pre-coding matrices, as discussed in detail above. The base station may then determine (at 315) whether or not the higher-level pre-coding matrices are complete. If these matrices are complete, then the base station may transmit (at 320) concurrent information to the users using the associated pre-coding matrices. However, if the base station determines (at 315) that some of the pre-coding matrices are not complete, and the base station may continue to associate (at 325) users with columns of higher-level pre-coding matrices.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. A method implemented in a base station having a plurality of antennas, comprising:
    associating, at the base station, users with different first pre-coding matrices based on information provided by the users and received by the base station using the plurality of antennas, wherein each pre-coding matrix can be associated with a predetermined number of users;
    combining users associated with the first pre-coding matrices into a first user group when each of the first pre-coding matrices is associated with less than the predetermined number of users; and
    associating users in the first user group with a second pre-coding matrix that is at a higher level in a code tree than the first pre-coding matrices, wherein pre-coding matrices at higher levels in the code tree are connected to pre-coding matrices at lower levels of the code tree by branches.

2. The method of claim 1, wherein associating the users with the first pre-coding matrices comprises:
    receiving, from each of the users, information indicating at least one preferred first pre-coding matrix from the first pre-coding matrices; and
    associating the users with the first pre-coding matrices based on the information indicating said at least one preferred first pre-coding matrix.

3. The method of claim 2, wherein associating the users with the first pre-coding matrices comprises:
    receiving, from the users, information indicative of at least one channel condition of at least one channel of air interfaces between the base station and the users; and
    associating the users with the first pre-coding matrices based on the information indicating said at least one channel condition.

4. The method of claim 3, wherein associating the users with the first pre-coding matrices comprises associating each user with a column of a first pre-coding matrix.

5. The method of claim 1, comprising transmitting information to the plurality of users concurrently using the first or second pre-coding matrices.

6. The method of claim 1, wherein associating users in the first user group with said at least one second pre-coding matrix comprises associating users in the first user group with at least one second pre-coding matrix that so the first pre-coding matrices correspond to a finer angular resolution than said at least one second pre-coding matrix.

7. A method implemented in a base station having a plurality of antennas, comprising:
    associating a plurality of users with a plurality of first pre-coding matrices based on information provided by the plurality of users;
    determining whether at least one of the plurality of first pre-coding matrices is incomplete, wherein determining whether at least one of the plurality of first pre-coding matrices is incomplete comprises determining that at least one of the plurality of first pre-coding matrices is incomplete when the number of users associated with said at least one first pre-coding matrix is less than the number of antennas included in the base station; and associating users with at least one second pre-coding matrix when at least one first pre-coding matrix is incomplete, the users being associated with said at least one incomplete first pre-coding matrix, and said at least one second pre-coding matrix being formed based on said at least one incomplete first pre-coding matrix.

8. A method implemented in a base station having a plurality of antennas, comprising:

associating, at the base station, users with first pre-coding matrices based on information provided by the users and received by the base station using the plurality of antennas;

determining that the first pre-coding matrices are incompletely associated with users when less than a threshold fraction of the columns of the first pre-coding matrices has been associated with a user;

combining users associated with the first pre-coding matrices into a first user group when the first pre-coding matrices are incompletely associated with users; and associating users in the first user group with a second pre-coding matrix that is associated with the first pre-coding matrices.

9. A method implemented in a base station having a plurality of antennas, comprising:

associating a plurality of users with a plurality of first pre-coding matrices based on information provided by the plurality of users;

determining that more than one of the plurality of first pre-coding matrices is incomplete;

associating users with at least one second pre-coding matrix when more than one first pre-coding matrix is incomplete, the users being associated with said more than one incomplete first pre-coding matrix, and said at least one second pre-coding matrix being formed based on said more than one incomplete first pre-coding matrix; and selecting a plurality of said more than one incomplete first pre-coding matrices based on a distance metric indicative of at least one distance between the plurality of said more than one incomplete first pre-coding matrices.

10. The method of claim 9, wherein associating users with said at least one second pre-coding matrix comprises associating users with at least one second pre-coding matrix that is part of an upper level of a tree structure, and wherein the plurality of incomplete first pre-coding matrices is part of a lower level of the tree structure.

11. The method of claim 9, comprising forming said at least one second pre-coding matrix based on the selected plurality of incomplete first pre-coding matrices.

12. The method of claim 11, comprising providing, to the plurality of users, information indicative of at least one of the second pre-coding matrices or the first pre-coding matrices.

13. A method implemented in a base station having a plurality of antennas, comprising:

associating, at the base station, users with different first pre-coding matrices based on information provided by the users and received by the base station using the plurality of antennas;

combining users associated with the first pre-coding matrices into a first user group when the different first pre-coding matrices are incompletely associated with users; and associating users in the first user group with a second pre-coding matrix that is at a higher level in a code tree than the first pre-coding matrices so that the second pre-coding matrix is more complete than the first pre-coding matrices, and wherein said at least one second pre-coding matrix comprises a plurality of second pre-coding matrices, and comprising:

determining whether at least one of the plurality of second pre-coding matrices is incomplete;

forming a second user group by grouping users associated with said at least one incomplete second pre-coding matrix with users associated with another second pre-coding matrix; and associating users in the second user group with at least one third pre-coding matrix when said at least one second pre-coding matrix is incomplete, said at least one third pre-coding matrix being at a higher level in the code tree than said at least one second pre-coding matrix and said another second pre-coding matrix.

14. A method implemented in a base station having a plurality of antennas, comprising:

associating, at the base station, users with different first pre-coding matrices based on information provided by the users and received by the base station using the plurality of antennas;

combining users associated with the first pre-coding matrices into a first user group when the different first pre-coding matrices are incompletely associated with users; and associating users in the first user group with a second pre-coding matrix that is at a higher level in a code tree than the first pre-coding matrices so that the second pre-coding matrix is more complete than the first pre-coding matrices, wherein associating users in the first user group with said at least one second pre-coding matrix comprises associating users in the first user group with at least one second pre-coding matrix that so the first pre-coding matrices correspond to a finer angular resolution than said at least one second pre-coding matrix, and wherein associating users in the first user group with said at least one second pre-coding matrix comprises associating users in the first user group with said at least one second pre-coding matrix using a distance metric that indicates an angle difference between main lobe directions of antenna patterns corresponding to the first and second pre-coding matrices.

15. A method implemented in a base station having a plurality of antennas, comprising:

associating, at the base station, users with first pre-coding matrices based on information provided by the users and received by the base station using the plurality of antennas, wherein each pre-coding matrix can be associated with a predetermined number of users; and consolidating the users associated with the first pre-coding matrices into a first user group assigned to a second pre-coding matrix when the first pre-coding matrices are associated with less than the predetermined number of users.

16. The method of claim 15, wherein consolidating the users comprises assigning the users to a second pre-coding matrix that is selected based on a distance metric indicative of at least one distance between the first pre-coding matrices and the second pre-coding matrix.

* * * * *